United States Patent
Liao

(10) Patent No.: US 12,374,713 B2
(45) Date of Patent: Jul. 29, 2025

(54) GRIPPING APPARATUS AND PROCESSING EQUIPMENT

(71) Applicant: CONTEMPORARY AMPEREX TECHNOLOGY (HONG KONG) LIMITED, Hong Kong (CN)

(72) Inventor: Hongyan Liao, Ningde (CN)

(73) Assignee: CONTEMPORARY AMPEREX TECHNOLOGY (HONG KONG) LIMITED, Hong Kong (CN)

(*) Notice: Subject to any disclaimer, the term of this patent is extended or adjusted under 35 U.S.C. 154(b) by 0 days.

(21) Appl. No.: 19/043,618

(22) Filed: Feb. 3, 2025

(65) Prior Publication Data

US 2025/0183350 A1 Jun. 5, 2025

Related U.S. Application Data

(63) Continuation of application No. PCT/CN2023/138884, filed on Dec. 14, 2023.

(30) Foreign Application Priority Data

Jan. 9, 2023 (CN) .......................... 202320056702.6

(51) Int. Cl.
 *H01M 10/04* (2006.01)
 *B25J 9/14* (2006.01)
 (Continued)

(52) U.S. Cl.
 CPC ......... *H01M 10/0404* (2013.01); *B25J 9/144* (2013.01); *B25J 9/1612* (2013.01); *B25J 9/1676* (2013.01); *B25J 19/0012* (2013.01)

(58) Field of Classification Search
 CPC ........ B25J 9/144; B25J 9/1612; B25J 9/1676; B25J 19/0012; H01M 10/0404
 See application file for complete search history.

(56) References Cited

U.S. PATENT DOCUMENTS

| 8,375,594 B1 | 2/2013 | Guenther |
| 2022/0250262 A1* | 8/2022 | Abdallah ................. B25J 9/144 |

FOREIGN PATENT DOCUMENTS

| CN | 208826665 U | 5/2019 |
| CN | 112061771 A | 12/2020 |

(Continued)

OTHER PUBLICATIONS

International Search Report in the international application No. PCT/CN2023/138884, mailed on Apr. 12, 2024, 7 pages with English translation.

(Continued)

*Primary Examiner* — Dale Moyer
(74) *Attorney, Agent, or Firm* — XSENSUS LLP

(57) ABSTRACT

This application relates to a gripping apparatus and processing equipment. The gripping apparatus includes: a base; a gripping assembly, spaced apart from the base along a preset direction; a balancing assembly, connected between the base and the gripping assembly and configured to provide a balancing force along the preset direction to balance a gravity of the gripping assembly and a target piece gripped by the gripping assembly; and a sensing assembly, mounted between the base and the gripping assembly and configured to sense a first displacement of the gripping assembly in the preset direction. The balancing assembly is able to drive the gripping assembly to move by a second displacement. The second displacement is greater than or equal to the first displacement. Both displacements occur the same direction.

11 Claims, 2 Drawing Sheets

(51) Int. Cl.
*B25J 9/16* (2006.01)
*B25J 19/00* (2006.01)

(56) References Cited

FOREIGN PATENT DOCUMENTS

| CN | 114147753 A | 3/2022 |
| CN | 217397834 U | 9/2022 |
| CN | 217669461 U | 10/2022 |
| CN | 217866802 U | 11/2022 |
| CN | 218927096 U | 4/2023 |

OTHER PUBLICATIONS

Written Opinion of the International Search Authority in the international application No. PCT/CN2023/138884, mailed on Apr. 12, 2024, 8 pages with English translation.

* cited by examiner

GRIPPING APPARATUS AND PROCESSING EQUIPMENT

CROSS-REFERENCE TO RELATED APPLICATIONS

This application is a Continuation of International Patent Application No. PCT/CN2023/138884, filed on Dec. 14, 2023, which claims priority to Chinese Patent Application No. 202320056702.6, filed on Jan. 9, 2023 and entitled "GRIPPING APPARATUS AND PROCESSING EQUIPMENT", each are incorporated herein by reference in their entirety.

TECHNICAL FIELD

This application relates to the field of battery technology, and in particular, to a gripping apparatus and processing equipment.

BACKGROUND

During production and processing of batteries, battery cells need to be transported and conveyed. In this process, in order to prevent the battery cells from falling off, the battery cells need to be gripped to ensure the stability of the battery cells during transportation.

However, if a battery cell is hit by an external force in this process, the battery cell will be structurally disrupted or even damaged, thereby impairing the overall production efficiency.

SUMMARY

In view of the above, it is necessary to provide a gripping apparatus and processing equipment to solve the problem that a battery cell is prone to be structurally disrupted due to collision under an external force during transportation.

According to a first aspect, this application provides a gripping apparatus, including:
- a pedestal;
- a gripping assembly, spaced apart from the base along a preset direction;
- a balancing assembly, connected between the base and the gripping assembly and configured to provide a balancing force along the preset direction to balance a gravity of the gripping assembly and a target piece gripped by the gripping assembly; and
- a sensing assembly, mounted between the base and the gripping assembly and configured to sense a first displacement of the gripping assembly in the preset direction under an external force.

The balancing assembly is able to drive, based on the first displacement, the gripping assembly to move by a second displacement, and the second displacement is greater than or equal to the first displacement, and both displacements occur in a same direction.

Through the above structure, in a process of transporting and transferring the target piece through the gripping apparatus, when the target piece is subjected to a very small external force, the balancing assembly can drive the gripping assembly and the target piece to quickly avoid the external structure, thereby reducing the probability of structural disruption of the target piece caused by collision with the external structure, and effectively protecting the structure of the target piece.

In some embodiments, the balancing assembly includes a driving piece. The driving piece is telescopically connected between the base and the gripping assembly along the preset direction. The driving piece is able to drive the gripping assembly to move relative to the base along the preset direction.

With the driving piece disposed, first, the total gravity of the gripping assembly and the target piece on the gripping assembly can be balanced, so that the gripping assembly and the target piece can be in a stable balanced state. Second, when the target piece contacts the external structure and is subjected to an external force, the driving piece can promptly drive the gripping assembly and the target piece to move relative to the base, thereby adjusting the position of the target piece, enabling the target piece to avoid the external structure, and reducing the probability of damage to the target piece caused by collision.

In some embodiments, the balancing assembly further includes an adjusting piece connected to the driving piece. The adjusting piece is configured to adjust a balancing force of the driving piece in the preset direction.

By controlling the adjusting piece, the amount of extension and retraction of the driving piece can be quickly adjusted, thereby adjusting the force applied by the driving piece to the gripping assembly and the target piece in the preset direction, and in turn, balancing the gravity of the gripping assembly and the target piece more steadily. In addition, when the target piece collides with an external structure, the amount of extension and retraction of the driving piece can be quickly adjusted by controlling the adjusting piece, thereby driving the gripping assembly to jointly adjust the position of the target piece, enabling the target piece to avoid the external structure more reliably, and protecting the target piece.

In some embodiments, the driving piece is configured to be a cylinder. A fixed end of the cylinder is connected to one of the base or the gripping assembly, and a movable end of the cylinder is connected to the other of the base or the gripping assembly.

With the cylinder disposed, the extension and reaction of the cylinder drive the gripping assembly to move relative to the base, thereby quickly adjusting the position of the target piece on the gripping assembly, enabling the target piece to more reliably avoid the external structure, and effectively protecting the structure of the target piece.

In some embodiments, the adjusting piece is an adjusting valve configured to adjust an air intake amount of the cylinder. With the adjusting valve disposed, the air intake pressure of the cylinder can be adjusted, thereby adjusting the magnitude of the balancing force provided by the cylinder, and controlling the positions of the gripping assembly and the target piece more accurately.

In some embodiments, the sensing assembly includes a sensor and a sensing piece that match each other. The sensor is connected to one of the base or the gripping assembly, and the sensing piece is connected to the other of the base or the gripping assembly.

When the gripping assembly moves by the first displacement along the preset direction under the external force, the sensing piece triggers the sensor.

The coordination between the sensor and the sensing piece enables a quick response to be made when the target piece collides with the external structure, and enables the balancing assembly to quickly drive the target piece to avoid the external structure, thereby effectively protecting the target piece.

In some embodiments, the gripping apparatus further includes a guide piece and a mating piece. The guide piece is disposed on one of the base or the gripping assembly, and the mating piece is disposed on the other of the base or the gripping assembly, so as to guide the gripping assembly to move relative to the base in the preset direction.

When the balancing assembly drives the gripping assembly and the target piece to move, the guide piece and the mating piece can play a guiding role, so that the gripping assembly and the target piece move more stably relative to the base.

In some embodiments, the guide piece is configured to be a slide rail extending along the preset direction. The mating piece is configured to be a slide block that mates with the slide rail.

The slide block slides inside the slide rail along the preset direction, thereby driving the gripping assembly connected to the slide block to move relative to the base along the preset direction, so as to adjust the position of the target piece.

In some embodiments, the gripping apparatus further includes a control assembly communicatively connected to the sensing assembly and the balancing assembly separately. The control assembly is configured to receive a signal from the sensing assembly and control the balancing assembly to drive the gripping assembly to move.

Through the above structure, when the sensing assembly is triggered, the balancing assembly can drive the target piece to move quickly to sense the target piece more sensitively and protect the target piece more effectively.

In some embodiments, the gripping assembly includes at least two gripping pieces configured to grip the target piece, and the gripping pieces are spaced apart along a direction intersecting the preset direction. In this way, a plurality of gripping pieces can grip a plurality of target pieces synchronously, thereby improving production efficiency.

According to a second aspect, this application provides a type of processing equipment, configured to process a battery cell. The processing equipment includes the gripping apparatus disclosed above. The gripping apparatus is configured to grip and transport the battery cell to be processed.

In the gripping apparatus and processing equipment, the gripping assembly can grip the target piece. At the same time, the balancing assembly provides a balancing force to balance the gravity of the gripping assembly and the target piece gripped by the gripping assembly, so that the target piece and the gripping assembly are in a critical state of weightlessness. At this time, the sum of all forces acting on the target piece and the gripping assembly is zero. In this way, when the target piece is subjected to an external force due to contact with an external structure, the gripping assembly and the target piece can move along the direction of the force under the action of a very small external force, thereby generating a first displacement. The first displacement can trigger the sensing assembly, enable the balancing assembly to immediately drive the gripping assembly and the target piece on the gripping assembly to move, enable the target piece to avoid the external structure, and reduce the probability of the target piece colliding again and being damaged.

Figure 1:
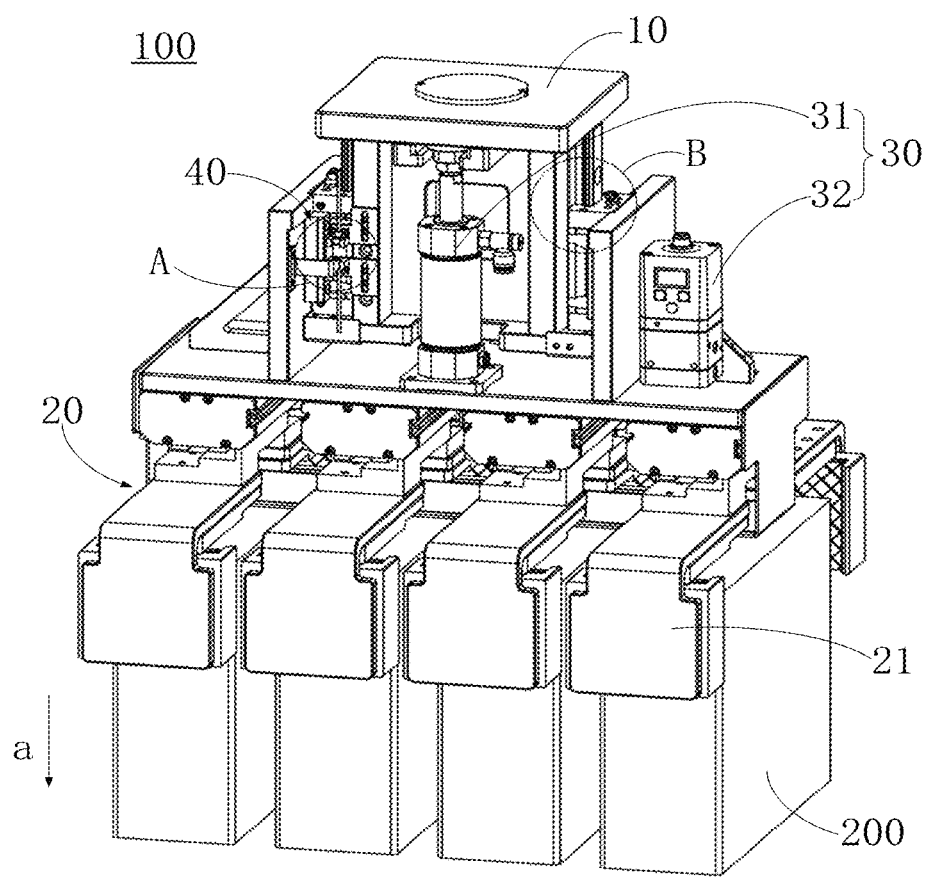
FIG. 1 is a schematic diagram of an overall structure of a gripping apparatus according to some embodiments of this application.

List of reference numerals: 100. gripping apparatus; 200. target piece; 10. base; 20. gripping assembly; 30. balancing assembly; 40. sensing assembly; 50. guide piece; 60. mating piece; 21. gripping piece; 31. driving piece; 32. adjusting piece; 41. sensor; 42. sensing piece; a. preset direction.

DETAILED DESCRIPTION OF EMBODIMENTS

To make the above objectives, features, and advantages of this application more apparent and comprehensible, the following describes specific embodiments of this application in detail with reference to drawings. Many details are expounded in the following description to facilitate thorough understanding of this application. However, this application can be implemented in many other ways different from those described herein. A person skilled in the art may make similar improvements without departing from the essence of this application. Therefore, this application is not limited to the specific embodiments disclosed below.

Understandably, in the description of this application, a direction or a positional relationship indicated by the terms such as "center", "longitudinal", "transverse", "length", "width", "thickness", "up", "down", "before", "after", "left", "right", "vertical", "horizontal", "top", "bottom", "in", "out", "clockwise", "counterclockwise", "axial", "radial", and "circumferential" is a direction or positional relationship based on the illustration in the drawings, and is merely intended for ease or brevity of description of this application, but not intended to indicate or imply that the mentioned device or component must be located in the specified direction or constructed or operated in the specified direction. Therefore, such terms are not intended as a limitation on this application.

In addition, the technical terms such as "first" and "second" are used merely for ease of description, but not to indicate or imply relative importance or implicitly specify the number of technical features mentioned. Therefore, the features preceded by "first" or "second" may explicitly or implicitly include at least one of such features. In the description of this application, unless otherwise expressly specified, "a plurality of" means at least two, for example, two, three, or more.

In this application, unless otherwise expressly specified and qualified, the terms such as "mounting", "concatenation", "connection", and "fixing" need to be understood in a broad sense, for example, understood as a fixed connection or a detachable connection or understood as being integrated into a whole; or understood as a mechanical connection or an electrical connection, a direct connection or an indirect connection implemented through an intermediary; or understood as interior communication between two components or interaction between two components. A person of ordinary skill in the art is able to understand the specific meanings of the terms in this application according to specific situations.

In this application, unless otherwise expressly specified and qualified, a first feature being "on" or "under" a second feature may be that the first feature is in direct contact with the second feature, or the first feature is in indirect contact with the second feature through an intermediary. In addition, a first feature being "on", "above", or "over" a second feature may be that the first feature is exactly above or obliquely above the second feature, or simply that the first feature is at an altitude higher than the second feature. A first feature being "under", "below", or "beneath" a second feature may be that the first feature is exactly under or obliquely under the second feature, or simply that the first feature is at an altitude lower than the second feature.

It is hereby noted that a component referred to as being "fixed to" or "disposed on" another component may be directly fixed onto the other component or may be fixed onto or disposed on the other component through an intermediate component. A component considered to be "connected to" another component may be directly connected to the other component or may be connected to the other component through an intermediate component. The terms "vertical", "horizontal", "up", "down", "left", "right", and other similar expressions used herein are merely for ease of description, but are not intended as a unique implementation.

Currently, as can be seen from the market trend, the application of power batteries is increasingly extensive. Power batteries are not only used in energy storage power systems such as hydro, thermal, wind, and solar power stations, but also widely used in electric means of transport such as electric bicycles, electric motorcycles, and electric vehicles, and used in many other fields such as military equipment and aerospace. The market demand for power batteries keeps soaring with the expansion of the application fields of the power batteries.

A battery cell is a minimum unit that makes up a battery. During production and processing of batteries, battery cells need to be transported and conveyed. For example, the battery cells need to be transferred from a previous processing site to a next processing site, or the battery cells need to be transported and placed at a target position. In this case, it is usually necessary to grip the battery cells by using a gripping apparatus, so as to transport and convey the battery cells.

When the gripping apparatus grips a battery cell, in order to ensure the stability of the grip and prevent the battery cell from falling off, a relatively large gripping force is usually required, so that the battery cell is not prone to move relative to the gripping apparatus under the action of an external force.

However, during the transportation and conveyance of battery cells, the battery cells are usually stacked or collide with an external structure, thereby potentially disrupting the structure of the battery cells under the action of external force, and impairing the production and processing efficiency of the battery cells.

In view of the above situation, some gripping apparatuses available currently are typically equipped with a moving mechanism and a sensor. When the target piece collides with the external structure, the target piece moves by a distance under the action of the external force, thereby triggering the sensor. In this way, the moving mechanism drives the target piece to avoid the external structure.

After studying the above structure, the applicant hereof finds that, due to the gravity of the target piece and the moving mechanism, when the target piece is subjected to an external force, the external force is firstly applied to offsetting the gravity. The external force can drive the target piece to move to trigger the sensor only after completely offsetting the gravity of the target piece and the moving mechanism.

However, the structural precision of the battery cell needs to be very high. Therefore, in the above structure, after the external force offsets the gravity of the target piece and the moving mechanism first, the external force is likely to have disrupted the structure of the battery cell, thereby failing to protect the battery cell.

In view of this, in order to enable the gripping apparatus to drive the battery cell to avoid the external structure more sensitively during the gripping of the battery cell and in order to prevent the battery cell from being damaged by an external force, the applicant hereof has designed a gripping apparatus after in-depth research. The gripping apparatus first balances, through a balancing assembly, a total gravity of a gripping assembly and a target piece gripped by the gripping assembly, leaves the target piece to be in a critical state of weightlessness. In this way, the gripping assembly and the target piece as a whole can move under the action of a very small external force to avoid the external structure and effectively protect the battery cell.

Referring to FIG. 1, an embodiment of this application provides a gripping apparatus 100, including a base 10, a gripping assembly 20, a balancing assembly 30, and a sensing assembly 40. The base 10 is configured to be connected to an external structure. The gripping assembly 20 is spaced apart from the base 10 along a preset direction a, and is configured to grip a target piece 200. The balancing assembly 30 is connected between the base 10 and the gripping assembly 20 and configured to provide a balancing force along the preset direction a to balance a gravity of the gripping assembly 20 and the target piece 200 gripped by the gripping assembly. The sensing assembly 40 is mounted between the base 10 and the gripping assembly 20 and configured to sense a first displacement of the gripping assembly 20 in the preset direction a under an external force. The balancing assembly 30 is able to drive, based on the first displacement, the gripping assembly 20 to move by a second displacement. The second displacement is greater than or equal to the first displacement, and both displacements occur in a same direction.

It is hereby noted that when the gripping apparatus 100 is applied to the battery field, the target piece 200 may be a battery cell. In other words, the battery cell is gripped by the gripping assembly 20 so as to be transported and conveyed. The base 10 is configured to be connected to an external structure, so that the gripping apparatus 100 can be mounted onto an external structure or connected to an external structure through the base 10. For example, the base 10 may be connected to an external mechanical arm, so that the mechanical arm controls the gripping apparatus 100 to move to transport and convey the battery cell.

In a specific embodiment, the preset direction a may be set to be the gravity direction. The base 10 and the gripping assembly 20 are spaced apart along the gravity direction, and the gripping assembly 20 is located below the base 10 to facilitate gripping of the target piece 200.

Before the target piece 200 is transferred by the gripping apparatus 100, the balancing assembly 30 provides a balancing force along the preset direction a to balance the gravity of the gripping assembly 20 and the target piece 200 gripped by the gripping assembly. In this way, the gripping assembly 20 and the target piece 200 can be in a critical state of weightlessness.

Specifically, in a case that the gravity of the target piece 200 gripped by the gripping assembly 20 is relatively large, for example, when a hard-shell battery is gripped by the gripping assembly 20, the balancing assembly 30 can apply an upward force onto the gripping assembly 20 and the target piece 200 to balance the total gravity of the gripping assembly 20 and the target piece 200 gripped by the gripping assembly. When the gripping assembly 20 grips a target piece 200 of a relatively small gravity instead, for example, when the gripping assembly 20 grips a pouch cell, the gripping assembly 20 may assume a tendency to move upward under the action of the balancing assembly 30. At this time, the balancing assembly 30 may be adjusted to apply a downward force to the gripping assembly 20 and the target piece 200 gripped by the gripping assembly. In this way, the gripping assembly 20 and the target piece 200 approach a balance again, thereby ensuring that the gripping assembly 20 and the target piece 200 are always in a balanced state.

In the balanced state, the target piece 200 is conveyed. In this process, if the target piece 200 collides with an external structure, due to the effect of the balanced state, only a very small external force can cause the target piece 200 and the gripping assembly 20 to generate a first displacement along the preset direction a, thereby triggering the sensing assembly 40. Upon the sensing assembly 40 being triggered, the balancing assembly 30 immediately drives the gripping assembly 20 and the target piece 200 gripped by the gripping assembly to move by a second displacement, so that the target piece 200 can quickly avoid the external structure and protect the target piece 200.

Through the above structure, in a process of transporting and transferring the target piece 200 through the gripping apparatus 100, when the target piece 200 is subjected to a very small external force, the balancing assembly 30 can drive the gripping assembly 20 and the target piece 200 to quickly avoid the external structure, thereby reducing the probability of structural disruption of the target piece 200 caused by collision with the external structure, and effectively protecting the structure of the target piece 200.

In some embodiments, the balancing assembly 30 includes a driving piece 31. The driving piece 31 is telescopically connected between the base 10 and the gripping assembly 20 along the preset direction a. The driving piece 31 is able to drive the gripping assembly 20 to move relative to the base 10 along the preset direction a.

Specifically, because the base 10 is fixedly connected to the external structure, during the extension and retraction of the driving piece 31 along the preset direction a, the position of the base 10 remains unchanged, and the gripping assembly 20 extends and retracts along with the driving piece 31 so as to move along the preset direction a and achieve the purpose of moving relative to the base 10.

When the preset direction a is the gravity direction, when the driving piece 31 drives the gripping assembly 20 to move up and down along the gravity direction, the gripping assembly and the target piece can be made to be in a balanced state by, on the one hand, adjusting the height of the target piece 200 on the gripping assembly 20 and, on the other hand, through the driving piece 31, balancing the total gravity of the gripping assembly 20 and the target piece 200 gripped by the gripping assembly.

Therefore, with the driving piece 31 disposed, first, the total gravity of the gripping assembly 20 and the target piece 200 on the gripping assembly can be balanced, so that the gripping assembly 20 and the target piece 200 can be in a stable balanced state. Second, when the target piece 200 contacts the external structure and is subjected to an external force, the driving piece 31 can promptly drive the gripping assembly 20 and the target piece 200 to move relative to the base 10, thereby adjusting the position of the target piece 200, enabling the target piece 200 to avoid the external structure, and reducing the probability of damage to the target piece 200 caused by collision.

In some embodiments, the balancing assembly 30 further includes an adjusting piece 32 connected to the driving piece 31. The adjusting piece 32 is configured to adjust a balancing force of the driving piece 31 in the preset direction a.

Therefore, by controlling the adjusting piece 32, the air intake pressure of the driving piece 31 can be quickly adjusted, thereby adjusting the balancing force applied by the driving piece 31 to the gripping assembly 20 and the target piece 200 in the preset direction a, and in turn, balancing the gravity of the gripping assembly 20 and the target piece 200 more steadily. In addition, when the target piece 200 collides with an external structure, the magnitude of the balancing force applied by the driving piece 31 can be quickly adjusted by controlling the adjusting piece 32, thereby driving the gripping assembly 20 to jointly adjust the position of the target piece 200, enabling the target piece 200 to avoid the external structure more reliably, and protecting the target piece 200.

In some embodiments, the driving piece 31 is configured to be a cylinder. A fixed end of the cylinder is connected to one of the base 10 or the gripping assembly 20, and a movable end of the cylinder is connected to the other of the base 10 or the gripping assembly 20.

The base 10 is fixedly connected to the external structure, that is, the position of the base 10 is fixed. Therefore, the fixed end of the cylinder is disposed onto the base 10, and the movable end of the cylinder is disposed in the gripping assembly 20; or, the movable end of the cylinder is disposed onto the base 10, and the fixed end of the cylinder is disposed in the gripping assembly 20. Both arrangements can drive the gripping assembly 20 to move relative to the base 10.

With the cylinder disposed, the extension and reaction of the cylinder drive the gripping assembly 20 to move relative to the base 10, thereby quickly adjusting the position of the target piece 200 on the gripping assembly 20, enabling the target piece to more reliably avoid the external structure, and effectively protecting the structure of the target piece 200.

In some embodiments, the adjusting piece 32 is an adjusting valve configured to adjust an air intake amount of the cylinder.

Specifically, the adjusting valve may be an electrically controlled proportioning valve, and communicates with an air inlet of the cylinder. By controlling the electrically controlled proportioning valve, the air intake pressure of the cylinder can be controlled, and therefore, the magnitude of the balancing force applied by the cylinder can be controlled.

After the gripping assembly 20 grips the target piece 200, the air intake amount of the cylinder is adjusted through the electrically controlled proportioning valve first. In this way, the force applied by the cylinder to the gripping assembly 20 can well balance the total gravity of the gripping assembly 20 and the target piece 200 gripped by the gripping assembly, so that the gripping assembly 20 and the target piece 200 are kept in a balanced state more steadily.

When the target piece 200 is subjected to an external force in a balanced state, the air intake amount of the cylinder can be adjusted again through the electrically controlled proportioning valve. In this way, the cylinder can drive the gripping assembly 20 and the target piece 200 to move, so that the target piece 200 can avoid the external structure, thereby protecting the structure of the target piece 200.

Therefore, with the adjusting valve disposed, the air intake pressure of the cylinder can be adjusted to quickly and accurately adjust the magnitude of the balancing force of the cylinder, thereby controlling the positions of the gripping assembly 20 and the target piece 200 more accurately.

Figure 2:
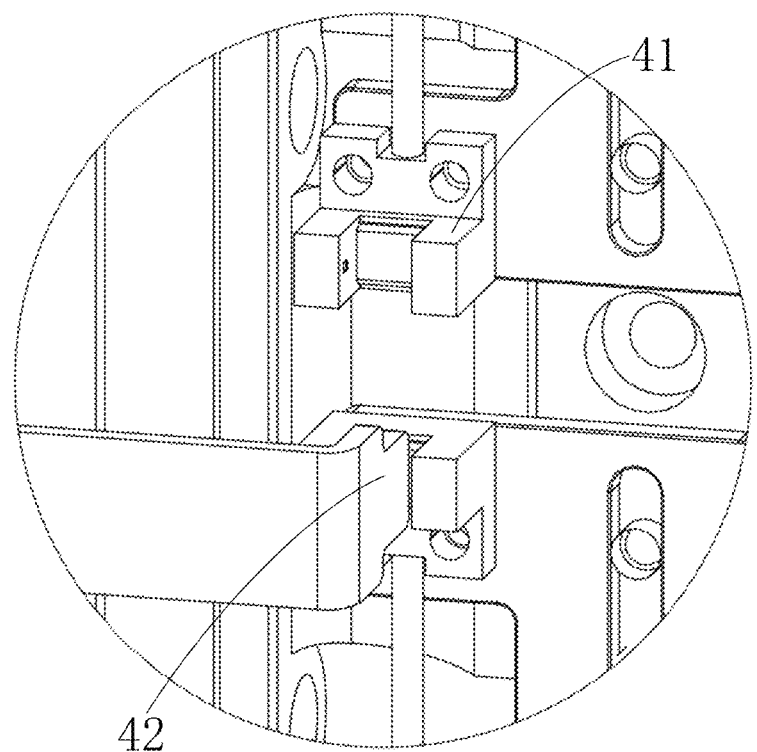
FIG. 2 is a close-up view of a part A shown in FIG. 1.

Referring to FIG. 1 and FIG. 2, in some embodiments, the sensing assembly 40 includes a sensor 41 and a sensing piece 42 that match each other. The sensor 41 is connected to one of the base 10 or the gripping assembly 20, and the sensing piece 42 is connected to the other of the base 10 or the gripping assembly 20. When the gripping assembly 20 moves by the first displacement along the preset direction a under the external force, the sensing piece 42 triggers the sensor 41.

Specifically, the sensor 41 and the sensing piece 42 are disposed in positions opposite to each other. The sensor 41 includes a sensing site. Under normal conditions, the gripping assembly 20 grips and transfers the target piece 200 smoothly. At this time, the sensing piece 42 is located outside the sensing site of the sensor 41 so that the sensing piece 42 is unable to trigger the sensor 41. When the target piece 200 collides with the external structure, the gripping assembly 20 and the target piece 200 move by a first displacement under the action of an external force, so that the sensing piece 42 and the sensor 41 move relative to each other. At this time, the sensing piece 42 moves into the sensing site, thereby triggering the sensor 41.

Based on this, the sensor 41 can be triggered by the sensing piece 42 when the sensor 41 and the sensing piece 42 move relative to each other. Therefore, the sensor 41 may be disposed on the base 10, and the sensing piece 42 may be disposed on the gripping assembly 20. In this case, the sensing piece 42 moves along with the gripping assembly 20 and triggers the sensor 41. Alternatively, the sensor 41 is disposed on the gripping assembly 20, and the sensing piece 42 is disposed on the base 10. In this case, the sensor 41 moves along with the gripping assembly 20, and is triggered by the sensing piece 42 during movement.

The coordination between the sensor 41 and the sensing piece 42 enables a quick response to be made when the target piece 200 collides with the external structure, and enables the balancing assembly 30 to quickly drive the target piece 200 to avoid the external structure, thereby effectively protecting the target piece 200.

Figure 3:
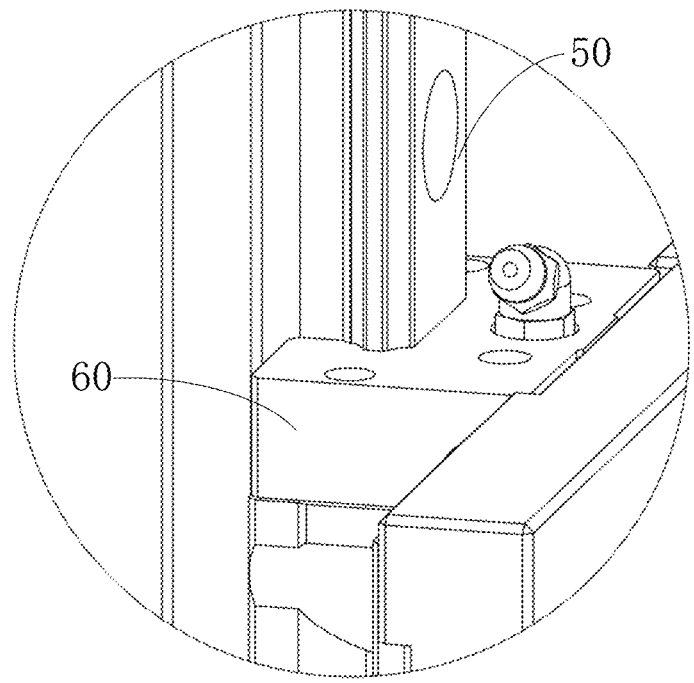
FIG. 3 is a close-up view of a part B shown in FIG. 1.

Referring to FIG. 1 and FIG. 3, in some embodiments, the gripping apparatus 100 further includes a guide piece 50 and a mating piece 60. The guide piece 50 is disposed on one of the base 10 or the gripping assembly 20, and the mating piece 60 is disposed on the other of the base 10 or the gripping assembly 20, so as to guide the gripping assembly 20 to move relative to the base 10 in the preset direction a.

Specifically, the guide piece 50 is disposed on the base 10, and the mating piece 60 is disposed on the gripping assembly 20. When the balancing assembly 30 drives the gripping assembly 20 and the target piece 200 to move, the guide piece 50 and the mating piece 60 can play a guiding role, so that the gripping assembly 20 and the target piece 200 move more stably relative to the base 10.

In some embodiments, the guide piece 50 is configured to be a slide rail extending along the preset direction a. The mating piece 60 is configured to be a slide block that mates with the slide rail.

The slide block slides on the slide rail along the preset direction a, thereby driving the gripping assembly 20 connected to the slide block to move relative to the base 10 along the preset direction a, so as to adjust the position of the target piece 200.

In some other embodiments, the guide piece 50 and the mating piece 60 may be other structures such as matching ball and screw, or matching pulley and slot, thereby also implementing the guiding function, the details of which are omitted here.

In some embodiments, the gripping apparatus 100 further includes a control assembly (not shown in the drawing) communicatively connected to the sensing assembly 40 and the balancing assembly 30 separately. The control assembly is configured to receive a signal from the sensing assembly 40 and control the balancing assembly 30 to drive the gripping assembly 20 to move.

Specifically, the control assembly may include a programmable logic controller (PLC). The PLC is communicatively connected to the sensor 41 and the adjusting valve separately. When the target piece 200 collides with an external structure, the target piece 200 is displaced under the action of the external force, so that the sensing piece 42 triggers the sensor 41. Upon being triggered, the sensor 41 transmits a signal to the PLC. The PLC controls the adjusting valve to adjust the air intake amount of the cylinder, so that the cylinder drives the gripping assembly 20 and the target piece 200 to move relative to the base 10. In this way, the target piece 200 can quickly avoid the external structure to prevent the external structure from causing damage to the target piece 200.

Through the above structure, when the sensing assembly 40 is triggered, the balancing assembly 30 can drive the target piece 200 to move quickly to sense the target piece 200 more sensitively and protect the target piece 200 more effectively.

In some embodiments, the gripping assembly 20 includes at least two gripping pieces 21 configured to grip the target piece 200, and the gripping pieces 21 are spaced apart along a direction intersecting the preset direction a.

Specifically, when the preset direction a is set to be the gravity direction, the gripping pieces 21 may be spaced apart along a horizontal direction. Each gripping piece 21 may be configured to grip a target piece 200. In this way, a plurality of gripping pieces 21 can grip a plurality of target pieces 200 synchronously, thereby improving production efficiency.

Understandably, in some other embodiments, the number of the gripping pieces 21 may be set to one, and the function of gripping the target piece 200 can also be implemented. Therefore, the specific number of the gripping pieces 21 may be adjusted according to actual needs, the details of which are omitted here.

Based on the same conception as the gripping apparatus 100, this application provides a type of processing equipment, configured to process a battery cell. The processing equipment includes the gripping apparatus 100 disclosed above. The gripping apparatus 100 is configured to grip and transport the battery cell to be processed.

In practical use of the technical solution disclosed herein, the base 10 is fixedly connected to an external mechanical arm first. The mechanical arm can drive the gripping apparatus 100 to move as a whole. When starting to work, each gripping piece 21 grips a battery cell. The adjusting valve is controlled to adjust the air intake amount of the cylinder, thereby adjusting the force applied by the cylinder to the gripping assembly 20 and the battery cell, and leaving the gripping assembly 20 and the battery cell to be in a balanced state together.

On this basis, the battery cell can be transported and transferred by the mechanical arm. In the transfer process, if the battery cell is subjected to an external force, the gripping assembly 20 and the battery cell moves upward under the action of a very small force, so that the sensing piece 42 triggers the sensor 41.

At this time, the sensor 41 transmits a signal to the control assembly, and the control assembly immediately controls the adjusting valve to adjust the air intake amount of the cylinder, thereby driving the gripping assembly 20 and the battery cell to further move upward to avoid the external structure, and in turn, protecting the structure of the battery cell.

The technical features in the foregoing embodiments may be combined arbitrarily. For brevity, not all possible combinations of the technical features in the embodiments are described. However, to the extent that no conflict exists, all such combinations of the technical features are considered falling within the scope hereof.

The foregoing embodiments merely describe several implementations of this application. The description is relatively detailed, but constitutes no limitation on the patent scope hereof. It is hereby noted that several variations and improvements, which may be made to the embodiments by a person of ordinary skill in the art without departing from the concept of this application, fall within the protection scope of this application. Therefore, the protection scope of this application is subject to the claims appended hereto.

What is claimed is:

1. A gripping apparatus, comprising:
    a base;
    a gripping assembly, spaced apart from the base along a preset direction;
    a balancing assembly, connected between the base and the gripping assembly and configured to provide a balancing force along the preset direction to balance a gravity of the gripping assembly and a target piece gripped by the gripping assembly; and
    a sensing assembly, mounted between the base and the gripping assembly and configured to sense a first displacement of the gripping assembly in the preset direction under an external force, wherein
    the balancing assembly is able to drive, based on the first displacement, the gripping assembly to move by a second displacement, and the second displacement is greater than or equal to the first displacement, and both displacements occur in a same direction.

2. The gripping apparatus according to claim 1, wherein the balancing assembly comprises a driving piece, the driving piece is telescopically connected between the base and the gripping assembly along the preset direction, and the driving piece is able to drive the gripping assembly to move relative to the base along the preset direction.

3. The gripping apparatus according to claim 2, wherein the balancing assembly further comprises an adjusting piece connected to the driving piece, and the adjusting piece is configured to adjust a balancing force of the driving piece in the preset direction.

4. The gripping apparatus according to claim 3, wherein the driving piece is configured to be a cylinder, a fixed end of the cylinder is connected to one of the base or the gripping assembly, and a movable end of the cylinder is connected to the other of the base or the gripping assembly.

5. The gripping apparatus according to claim 4, wherein the adjusting piece is an adjusting valve configured to adjust an air intake amount of the cylinder.

6. The gripping apparatus according to claim 1, wherein the sensing assembly comprises a sensor and a sensing piece that match each other, the sensor is connected to one of the base or the gripping assembly, and the sensing piece is connected to the other of the base or the gripping assembly; and
    when the gripping assembly moves by the first displacement along the preset direction under the external force, the sensing piece triggers the sensor.

7. The gripping apparatus according to claim 1, wherein the gripping apparatus further comprises a guide piece and a mating piece, the guide piece is disposed on one of the base or the gripping assembly, and the mating piece is disposed on the other of the base or the gripping assembly, so as to guide the gripping assembly to move relative to the base in the preset direction.

8. The gripping apparatus according to claim 7, wherein the guide piece is configured to be a slide rail extending along the preset direction, and the mating piece is configured to be a slide block that mates with the slide rail.

9. The gripping apparatus according to claim 1, wherein the gripping apparatus further comprises a control assembly communicatively connected to the sensing assembly and the balancing assembly separately, and the control assembly is configured to receive a signal from the sensing assembly and control the balancing assembly to drive the gripping assembly to move.

10. The gripping apparatus according to claim 1, wherein the gripping assembly comprises at least two gripping pieces configured to grip the target piece, and the gripping pieces are spaced apart along a direction intersecting the preset direction.

11. A type of processing equipment, configured to process a battery cell, wherein the processing equipment comprises the gripping apparatus according to claim 1, and the gripping apparatus is configured to grip and transport the battery cell to be processed.

* * * * *